United States Patent
Bargach et al.

(10) Patent No.: US 10,760,414 B1
(45) Date of Patent: Sep. 1, 2020

(54) DATA TRANSMISSION SYSTEM

(71) Applicant: ISODRILL, INC., Houston, TX (US)

(72) Inventors: Saad Bargach, Bellville, TX (US); Stephen D. Bonner, Sugar Land, TX (US)

(73) Assignee: Isodrill, Inc., Houston, TX (US)

( * ) Notice: Subject to any disclaimer, the term of this patent is extended or adjusted under 35 U.S.C. 154(b) by 0 days.

(21) Appl. No.: 16/510,450

(22) Filed: Jul. 12, 2019

(51) Int. Cl.
| | |
|---|---|
| *G01V 3/28* | (2006.01) |
| *E21B 47/13* | (2012.01) |
| *H01Q 1/22* | (2006.01) |
| *H01Q 1/04* | (2006.01) |
| *G01V 3/20* | (2006.01) |
| *E21B 47/12* | (2012.01) |
| *H01Q 19/10* | (2006.01) |
| *H01Q 7/00* | (2006.01) |
| *G01V 3/30* | (2006.01) |
| *H01Q 7/06* | (2006.01) |
| *H01Q 7/08* | (2006.01) |

(52) U.S. Cl.
CPC .............. *E21B 47/13* (2020.05); *G01V 3/28* (2013.01); *H01Q 1/04* (2013.01); *H01Q 1/22* (2013.01); *E21B 47/12* (2013.01); *G01V 3/20* (2013.01); *G01V 3/30* (2013.01); *H01Q 7/00* (2013.01); *H01Q 7/06* (2013.01); *H01Q 7/08* (2013.01); *H01Q 19/102* (2013.01)

(58) Field of Classification Search
CPC .......... E21B 47/122; G01V 3/20; G01V 3/28; G01V 3/30; G01V 3/24; H01Q 19/102; H01Q 7/00; H01Q 7/06; H01Q 7/08
See application file for complete search history.

(56) References Cited

U.S. PATENT DOCUMENTS

| | | | | |
|---|---|---|---|---|
| 5,200,705 | A | * 4/1993 | Clark | G01V 3/20 324/338 |
| 7,271,592 | B1 | * 9/2007 | Gerald, II | G01R 33/307 324/318 |
| 2005/0200552 | A1 | * 9/2005 | Davidson | H01Q 1/36 343/895 |
| 2005/0218898 | A1 | * 10/2005 | Fredette | G01V 3/30 324/342 |
| 2009/0166023 | A1 | * 7/2009 | Svenning | E21B 47/122 166/65.1 |
| 2016/0230544 | A1 | * 8/2016 | Han | E21B 47/122 |

* cited by examiner

*Primary Examiner* — Benyam Haile
(74) *Attorney, Agent, or Firm* — Morgan, Lewis & Bockius LLP

(57) ABSTRACT

A data transmission system for use with a drill string in a primary wellbore is disclosed. The data transmission system includes a toroidal antenna assembly. The toroidal antenna assembly is disposed around the drill string at a primary downhole location within the primary wellbore and configured to transmit a signal from a transmitter. The signal corresponds to sensor data. The toroidal antenna assembly includes a plurality of toroidal antennas, wherein each toroidal antenna is configured to transmit the same signal from the transmitter. Because a plurality of toroidal antennas are utilized to transmit the same signal, construction of the drill string can be more mechanically robust than a conventional insulated gap collar while permitting reliable and fast transmission of sensor data to the surface.

26 Claims, 6 Drawing Sheets

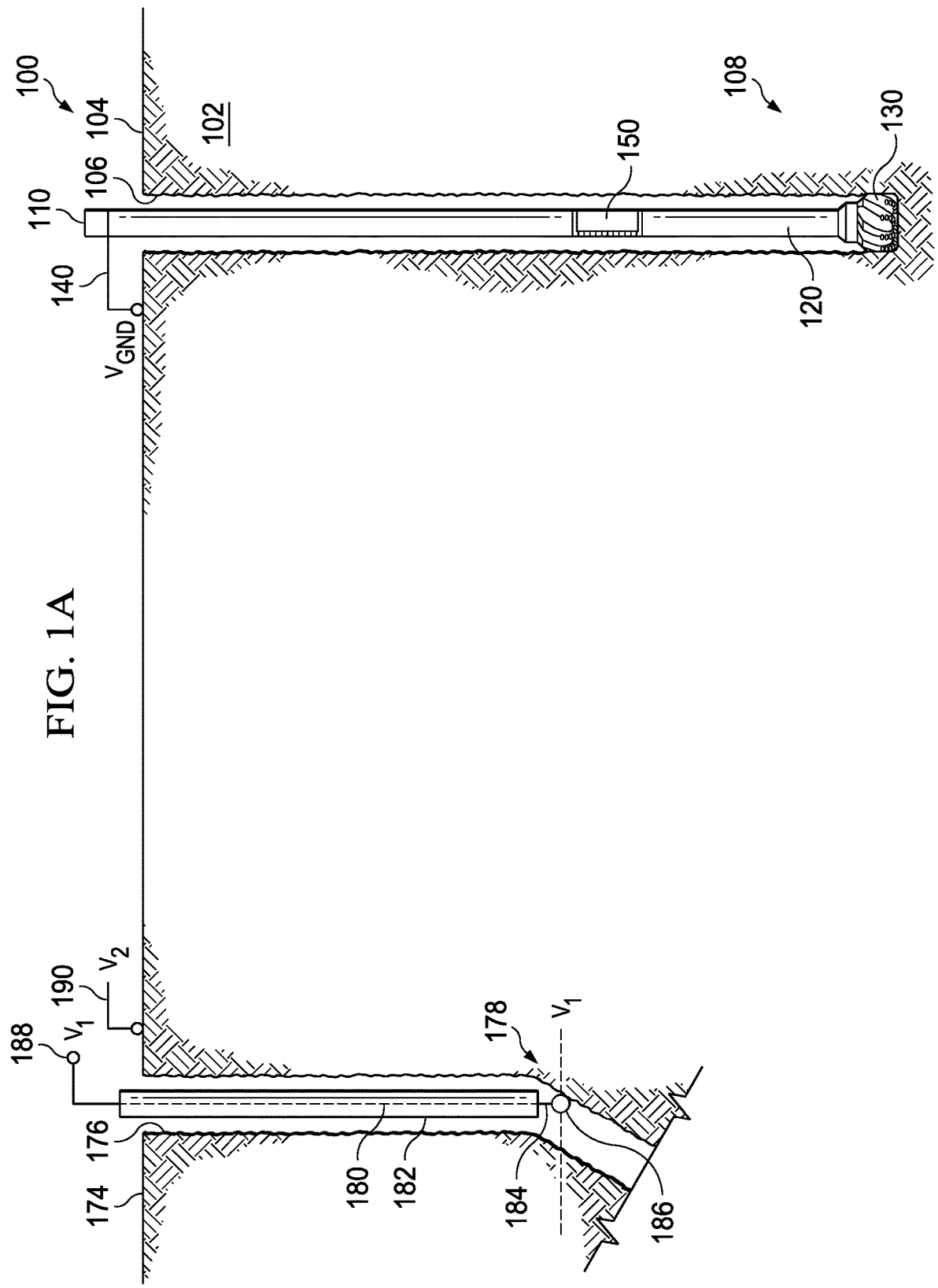

DATA TRANSMISSION SYSTEM

TECHNICAL FIELD

The present disclosure relates generally to data transmission systems, and more particularly, to electromagnetic (EM) data transmission systems for use within wellbores.

BACKGROUND

Wells are drilled to facilitate the extraction of hydrocarbons from a formation. During the drilling of a well, various drilling parameters can be monitored to adjust and optimize drilling operations. For example, sensors may be utilized to monitor parameters for steering a drill bit, measurements for the optimization of drilling efficiency, formation electrical resistivity, downhole pressure, direction and inclination of the drill bit, torque on bit, weight on bit, etc. During operation, sensor readings or data from the downhole sensors can be transmitted to the surface for monitoring, analysis, decision-making, and otherwise controlling drilling operations.

Drilling systems can transmit data from downhole sensors to a surface location for the above-mentioned purposes. For example, a drilling system can transmit data from a downhole location by introducing an electrical gap between the two ends of the drill string and emitting an electric field from the gap to transmit data to the surface. However, one drawback of conventional EM data transmission systems is that introducing an electrical gap into the drill string mechanically weakens the drill string, as the electrical gap is often created by sandwiching low-modulus insulating materials between two separate metallic sections of one or more drill collars. Insulating materials may have temperature range limitations that may limit drilling operations. Further, an electrical gap may only be incorporated in several locations within the drill string.

Other EM data transmission methods or systems may avoid the use of an electrically insulating gap within the drill string. However, other EM transmission methods may not sufficiently transmit data to the surface due to power and frequency constraints. Therefore, what is needed is an apparatus, system or method that addresses one or more of the foregoing issues, among one or more other issues.

SUMMARY OF THE INVENTION

A data transmission system for use with a drill string in a primary wellbore is disclosed. The data transmission system includes a toroidal antenna assembly. The toroidal antenna assembly is disposed around the drill string at a primary downhole location within the primary wellbore and configured to transmit a signal from a transmitter. The signal corresponds to sensor data. The toroidal antenna assembly includes a plurality of toroidal antennas, wherein each toroidal antenna is configured to transmit the same signal from the transmitter. Because a plurality of toroidal antennas are utilized to transmit the same signal, construction of the drill string can be more mechanically robust than a conventional insulated gap collar while permitting reliable and fast transmission of sensor data to the surface.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 1A is a schematic view of a drilling system.

DETAILED DESCRIPTION

Figure 1B:
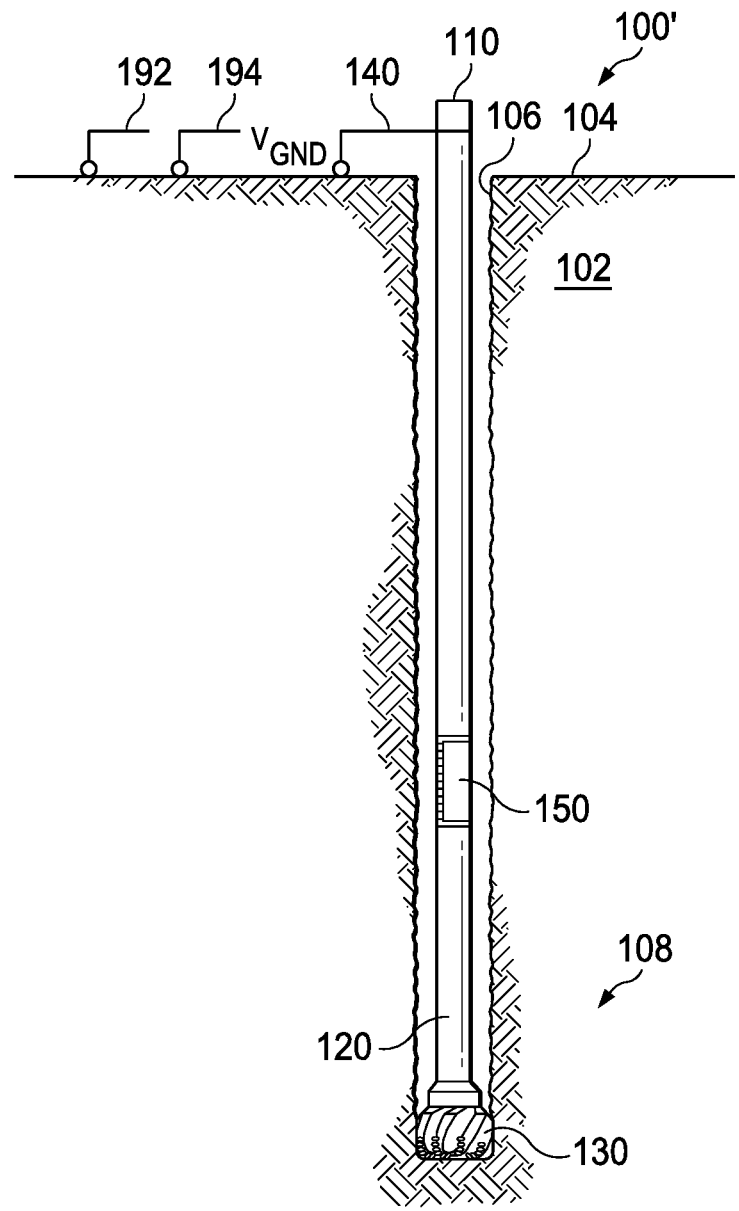
FIG. 1B is a schematic view of a drilling system.

FIG. 1A is a schematic view of a drilling system 100. In the depicted example, the drilling system 100 can be utilized to drill a primary wellbore 106 through a formation 102 and can facilitate the transmission of telemetry information from a downhole location 108 to a surface location 104 for logging and real-time control of drilling operations.

As illustrated, a drill bit 130 coupled to a downhole end of a drill string 110 can be rotated within the formation 102 to form the primary wellbore 106. During the drilling operation, the drill string 110 can extend within the primary wellbore 106 from the surface location 104 to the downhole location 108. As can be appreciated, the drilling system 100 can form vertical wells, horizontal wells, lateral wells, and/or utilize directional drilling techniques.

In some embodiments, various sensors disposed within or along the drill string 110 can be used to measure and observe parameters at the drill bit 130 or generally at the downhole location 108. In the depicted example, the drill string 110 can include sensors and other electronics within a bottom hole assembly (BHA) 120 disposed at a downhole end of the drill string 110. In some embodiments, the bottom hole assembly 120 is coupled to the drill string 110 and/or the drill bit 130.

During operation, a toroidal antenna assembly 150 can transmit sensor information from the sensors disposed within the bottom hole assembly 120 (and other locations within the drill string 110) to a remote location. As described herein, the toroidal antenna assembly 150 can transmit sensor information using electro-magnetic signals or fields (EM telemetry). As can be appreciated, the toroidal antenna assembly 150 can include one or more antennas that are electro-magnetically isolated or insulated from the grounded drill string 110. Optionally, the drill string 110 can be electrically connected to a ground stake 140. In the depicted example, the toroidal antenna assembly 150 can be disposed within the drill string 110 and offset from the bottom hole assembly 120. In some embodiments, the toroidal antenna assembly 150 can be integrated with or otherwise included within the bottom hole assembly 120.

In some embodiments, the toroidal antenna assembly 150 can transmit sensor information to a downhole electrode 180 disposed within a secondary wellbore 176 drilled in the formation 102. During operation, the downhole electrode 180 can receive the electro-magnetic signals or fields generated by the toroidal antenna assembly 150.

As illustrated, the downhole electrode 180 includes a conductor 184 that extends within the secondary wellbore 176 from a secondary surface location 174 to a secondary downhole location 178. The conductor 184 can be shrouded, shielded, or covered with an insulator 182 that extends along the length of the conductor 184. In some applications, by increasing the insulated length of the conductor 184, reception of electro-magnetic signals by the downhole electrode 180 can be improved. As illustrated, the insulator 182 can terminate to expose a downhole end of the conductor 184, defining a receiving end 186 of the downhole electrode 180.

Therefore, during operation, the receiving end 186 of the downhole electrode 180 can facilitate the reception of electro-magnetic signals from the toroidal antenna assembly 150. Optionally, the downhole electrode 180 can utilize the ground stake 190 as a reference. In some embodiments, the receiving end 186 of the downhole electrode 180 can be disposed at a secondary downhole location 178 that is similar to the depth or location of the toroidal antenna assembly 150 at the downhole location 108 in the primary wellbore 106. In some applications, the depth of the secondary downhole location 178 and/or the downhole location 108 can range from 1,000 to 15,000 feet or any other suitable depth. Further, the secondary wellbore 176 can be drilled or otherwise formed to be laterally offset from the primary wellbore 106 within the formation 102. For example, the secondary wellbore 176 can be drilled to be within 50 to 50,000 feet of the toroidal antenna assembly 150.

As can be appreciated, the secondary wellbore 176 may be drilled prior to the drilling of the primary wellbore 106. For example, the secondary wellbore 176 may be a former production well that has yet to be plugged and abandoned. In some applications, upon identifying the location of the primary wellbore 106, an appropriate or optimal secondary wellbore 176 can be selected from existing wellbores to avoid further drilling operations. Advantageously, by transmitting from a toroidal antenna assembly 150 at the downhole location 108 to the downhole electrode 180 disposed at the secondary downhole location 178, the drilling system 100 can effectively transmit information at lower transmission power and frequencies, avoiding limitations with transmission equipment. In some embodiments, the drilling system 100 can transmit information at frequencies between approximately 1 Hz and 200 Hz.

Signals received by the downhole electrode 180 can be transferred to a surface end 188 of the conductor 184. Optionally, the received signals can be processed at the secondary surface location 174, transferred to the surface location 104 for processing, or transferred to another suitable location. As can be appreciated, any suitable transmission method can be utilized.

FIG. 1B is a schematic view of a drilling system 100'. For example, the drilling system 100' can transmit sensor information from the downhole location 108 directly to a surface location 104. In the depicted example, the toroidal antenna assembly 150 can transmit sensor information to a pair of electrodes 192, 194 disposed at the surface location 104.

Figure 2:
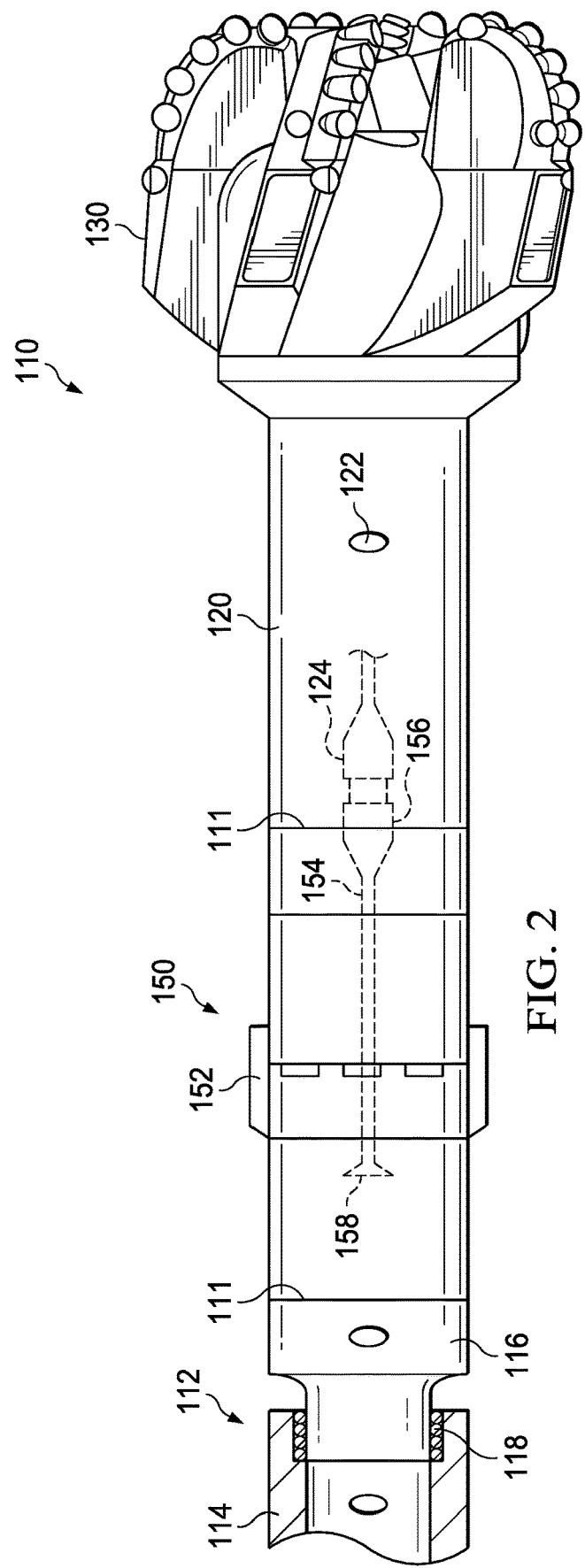
FIG. 2 is a partial elevation view of a downhole portion of a drill string.

FIG. 2 is a partial elevation view of a downhole portion of a drill string 110. In the depicted example, the toroidal antenna assembly 150 receives sensor information or parameters from one or more sensors 122 disposed within the bottom hole assembly 120. In some applications, the sensors 122 can be configured to detect drilling parameters related to directional drilling systems, such as rotary steerable collars, measurements for the optimization of drilling efficiency, electrical resistivity of the formation 102, etc. Optionally, sensors 122 can be configured to detect torque on bit, weight on bit, or other drilling parameters. In some applications, the sensors 122 can be located near the drill bit 130, allowing for the sensors 122 to more accurately determine the conditions at the drill bit 130.

During operation, sensor information is sent from the sensors 122 to the toroidal antenna assembly 150 via a bus connector 154. In the depicted example, the downhole connector end 156 of the bus connector 154 engages with the bottom hole assembly connector 124 to transfer data from the sensors 122. As illustrated, the uphole connector end 158 of the bus connector 154 is operatively coupled with the toroidal antenna assembly 150. In some embodiments, the bus connector 154 is rotatable to allow relative rotation of the bottom hole assembly 120 and the toroidal antenna assembly 150.

As illustrated, the toroidal antenna assembly 150 can be disposed at the downhole end of the drill string 110. For example, the toroidal antenna assembly 150 is illustrated as disposed between a mud motor 112 and the bottom hole assembly 120. In the depicted example, the toroidal antenna assembly 150 is disposed below the mud motor 112. During operation, the mud motor 112 can rotate the output shaft 116 relative to the mud motor stator 114 to rotate the drill bit 130. The mud motor stator 114 can include bearings 118 to support the output shaft 116. Advantageously, by positioning the toroidal antenna assembly 150 downhole of the mud motor 112, the drilling system 100 can eliminate the need for transmitting data across the mud motor 112 using short hop telemetry systems. As can be appreciated, the toroidal antenna assembly 150 can be disposed uphole of the mud motor 112 in some configurations.

Optionally, the toroidal antenna assembly 150 can be coupled to other components of the drill string 110 at threaded joints 111. In some applications, the threaded joints 111 can be coupled in the field or off site.

As illustrated, the toroidal antenna assembly 150 can be disposed around or otherwise surround the mandrel, drill pipe, or collar that forms the drill string 110. In some embodiments, a retainer 152 can be disposed around at least a portion of the toroidal antenna assembly 150. The retainer 152 can circumferentially encase the toroidal antenna assembly 150 to prevent separation of the toroidal antenna assembly 150 from an underlying mandrel, drill pipe, or collar. In some application, the retainer 152 can further act as a wear band, preventing wear from rotation and damage caused by direct contact with the formation 102.

Figure 3:
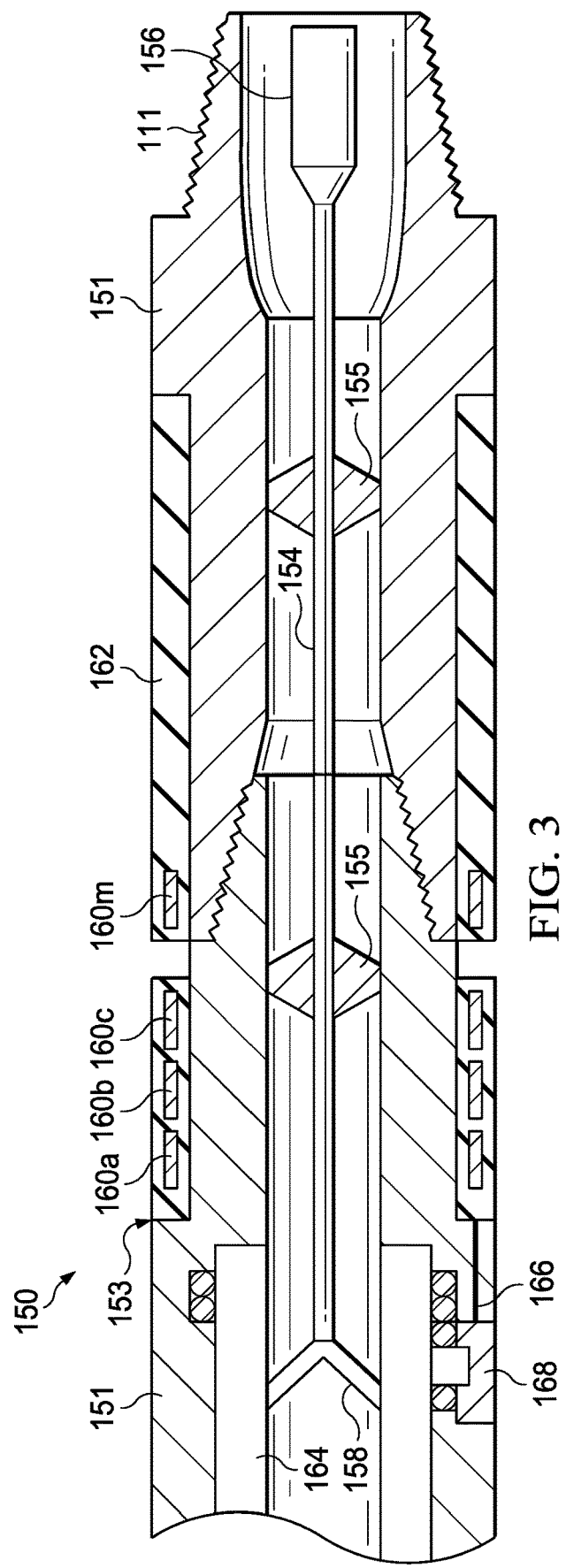
FIG. 3 is a cross-sectional view of a toroidal antenna assembly.

FIG. 3 is a cross-sectional view of a toroidal antenna assembly 150. In the depicted example, the toroidal antenna assembly 150 transmits received sensor information through one or more toroidal antennas 160*m*. In some embodiments, the toroidal antenna assembly 150 transmits received sensor information through three or more toroidal antennas 160*m*. During operation, electronic components 164 receive and process sensor signals from sensors 122 connected to the bus connector 154. The bus connector 154 can be coupled to the electronic components 164 at the uphole connector end 158. Optionally, the bus connector 154 can be stabilized or aligned within the collars 151 forming the toroidal antenna assembly 150 with one or more centralizers 155.

The electronic components 164 can include a transmitter to provide a transmission signal to one or more toroidal antennas 160*m* to transmit an electromagnetic signal therefrom. The electronic components 164 can include a modulator or other suitable components to encode or process the sensor information for transmission over the toroidal antennas 160*m*. Optionally, external components can interface with the electronic components 164 either via a wire harness 166 and/or a multi-pin feed through pressure bulkhead 168.

Figure 4A:
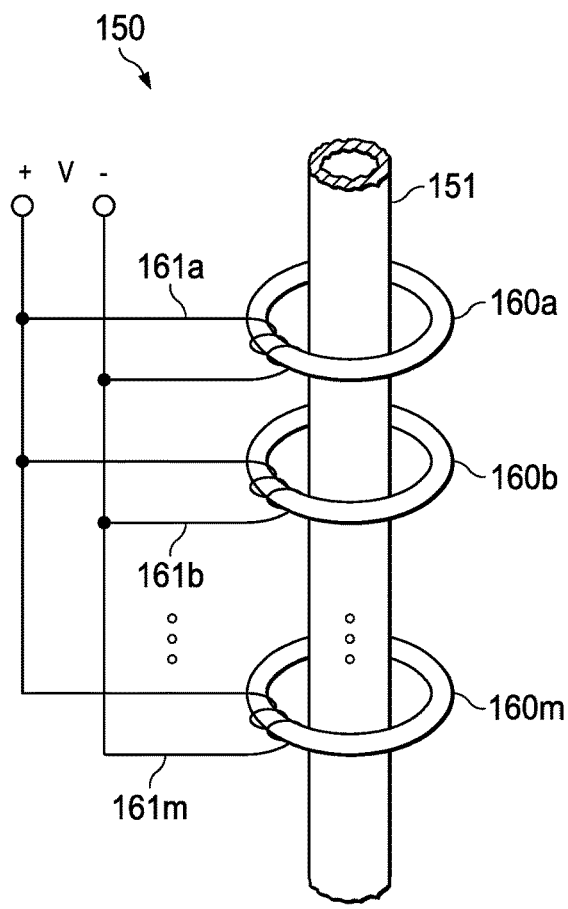
FIG. 4A is a schematic view of a toroidal antenna assembly with the primary windings connected in parallel.

FIG. 4A is a schematic view of a toroidal antenna assembly 150 with the primary windings 161a, 161b . . . 161m connected in parallel. With reference to FIGS. 3 and 4A, in the depicted example, the one or more toroidal antennas 160m are operatively coupled to the electronic components 164 to transmit the sensor information using electro-magnetic signals. The toroidal antenna 160m can be formed from a coil of rounded wire. Optionally, the coil of rounded wire can be wound around a suitable core, such as a ferromagnetic core. In some embodiments, the toroidal antenna 160m can be formed into a generally annular (or donut) shape, and may be disposed around an outside diameter of the collar 151. As can be appreciated, parameters of the toroidal antenna 160m, such as the cross-sectional profile and the number of turns of wire of the winding 161m can be modified.

During operation, the toroidal antenna 160m can operate as a transformer where a voltage difference is created along the collar 151. The current driven by a toroidal antenna 160m is dependent upon the voltage difference that is created along the length of the collar 151 above and below the toroidal antenna 160m. The primary winding 161m of the toroidal antenna 160m can include multiple turns and can be solenoidal to couple to the magnetic toroidal core. As can be appreciated, the strength of the signal from the toroidal antenna assembly 150, is equal to the primary voltage divided by the number of primary turns of the winding 161m of each toroidal antenna 160m.

In prior art systems, the voltage difference in the drill collar created by a toroidal transmitter, and the resulting current injected into the formation, is too small to reliably transmit information to a receiving electrode at any significant distance from the transmitter. For example, U.S. Pat. No. 4,181,014 discusses (at column 6, line 61 to column 7, line 12) using two toroidal transmitters on the drill collar, each being driven at a different frequency for two distinct communication channels. Each toroid would individually drive a current up the drill collar encoded with two distinct types of information of interest to the drilling operation at earth's surface. Because each individual toroid is driven by a different frequency, the signal strength in each communication channel would be too weak to be useful over any practical distance of downhole signal transmission.

To solve this problem, in some embodiments, using multiple toroidal antennas 160m operating at the same frequency and phase can boost the voltage along the axis of the collar 151 allowing the electronic components 164, such as the transmitter, to emit more current into the formation. Because the flow of current into the formation is governed by Ohm's law [VAR], an increase in transmitter voltage results in increased transmitter current, resulting in better signal amplitude at the receiving electrode. Advantageously, the toroidal antenna assembly 150 injects sufficient current into the formation to produce transmission signal levels similar to or greater than those provided by a conventional electromagnetic telemetry apparatus with batteries and an insulating gap, which prior art systems cannot provide.

For example, embodiments of the present invention, as illustrated in FIG. 4A, use an array of multiple toroidal antennas 160a, 160b, 160c . . . 160m driven in parallel to boost the total voltage difference created along the length of the collar 151 from below to above the array of toroidal antennas 160a, 160b, 160c . . . 160m to permit reliable signal modulation/demodulation. During operation, if the antenna array includes m=10 toroidal antennas and each of the individual coil windings 161a, 161b, 161c . . . 161m include n=5 turns, the toroidal antenna assembly 150 can provide a voltage difference from below to above the toroidal antenna assembly 150 that is approximately double a given drive voltage. In some applications, if the toroidal antenna assembly 150 is provided a 10V peak drive voltage, then the voltage difference from below to above the toroidal antenna assembly 150 can be 20V peak.

Figure 4B:
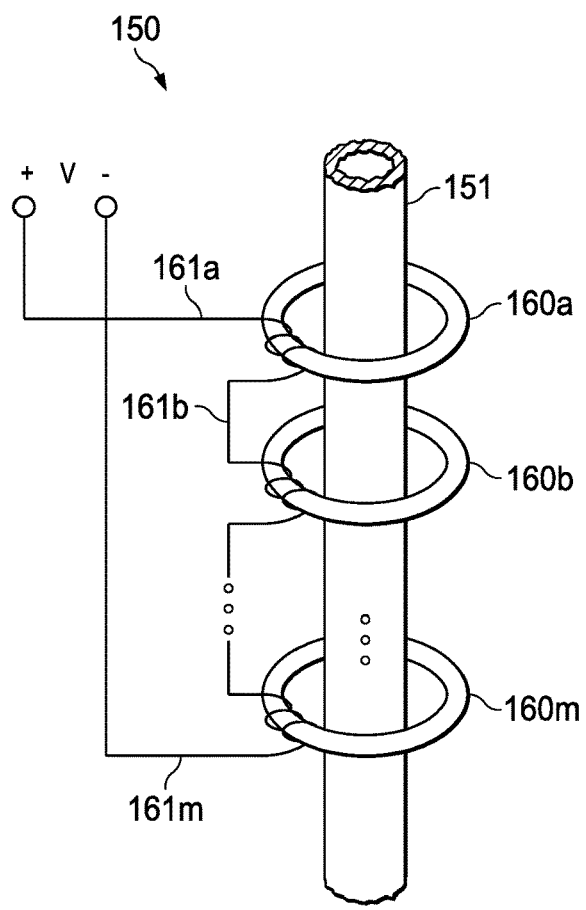
FIG. 4B is a schematic view of a toroidal antenna assembly with the primary windings connected in series.

As can be appreciated, any suitable number of toroidal antennas 160m can be utilized. Each of the toroidal antennas 160m can have a same or different configuration as described herein. In some embodiments, the individual coil windings 161a, 161b, 161c . . . 161m on each of the toroidal antennas 160a, 160b, 160c . . . 160m can be connected in series, a combination of series and parallel, or driven or buffered independently but with identical signals. For example, FIG. 4B is a schematic view of a toroidal antenna assembly 150 with the primary windings 161a, 161b, 161c . . . 161m connected in series.

Figure 4C:
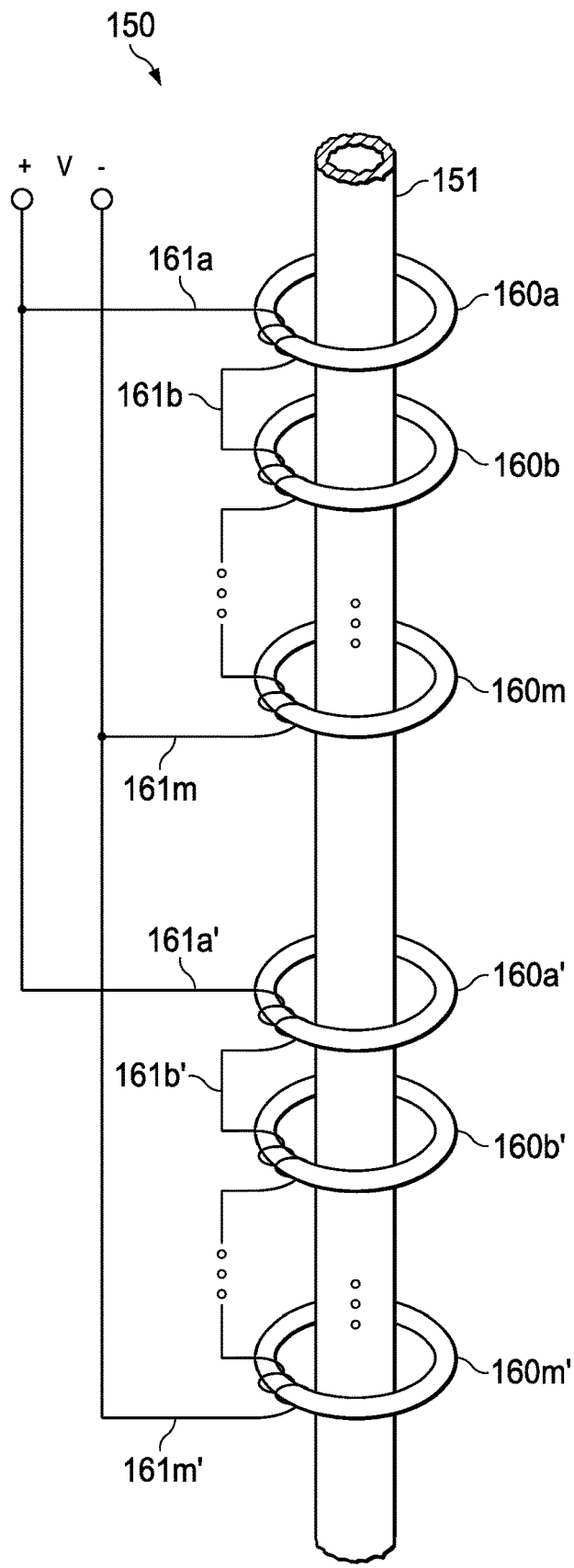
FIG. 4C is a schematic view of a toroidal antenna assembly with the primary windings connected in both series and parallel.

In another example, FIG. 4C is a schematic view of a toroidal antenna assembly 150 with the primary windings 161a, 161b . . . 161m and 161a', 161b' . . . 161m' connected in both series and parallel. In the depicted example, a first group of individual coil windings 161a, 161b . . . 161m of the toroidal antennas 160a, 160b . . . 160m are each connected in series and a second group of individual coil windings 161a', 161b' . . . 161m' of the toroidal antennas 160a', 160b' . . . 160m' are also each connected in series. As illustrated, the first group of individual coil windings 161a, 161b . . . 161m and the second group of individual coil windings 161a', 161b' . . . 161m' are driven in parallel by the voltage source.

In some embodiments, the toroidal antenna assembly 150 can be used in conjunction with downhole power generation mechanisms, providing a significant advantage over existing downhole technology, namely, an increase in the amount of current that can be driven into the formation compared with the present limitations on the current supplied by downhole batteries. In some applications, the use of a single toroid can step up the current introduced into the formation, exceeding the performance of a battery with an insulating gap. Further, using a downhole mud powered turbine and alternator along with an array of toroidal antennas 160m can provide higher drive voltages than prior art systems.

In some embodiments, the toroidal antennas 160m can be disposed within an insulator 162 to electrically insulate or shield the toroidal antennas 160m from the collar 151 and other components of the drill string 110. As illustrated, the insulator 162 can encase the toroidal antennas 160m. Optionally, the insulator 162 can encase multiple toroidal antennas 160a, 160b, 160c . . . 160m. In some embodiments, the insulator 162 can be annularly disposed around the collar 151. Optionally, the insulator 162 can be made from a resilient material such as an elastomer or any other suitable insulating material. In some configurations, toroidal antennas 160M can be prefabricated within an insulator 162. As illustrated in FIG. 3, the axial length of insulator 162 may be greater than that necessary to encase toroidal antennas 160a, 160b, 160c . . . 160m.

In some embodiments, the insulator 162 can include an anti-rotation feature 153 to prevent the rotation of the insulator 162 and/or the toroidal antennas 160m relative to the collar 151. For example, the anti-rotation feature 153 can include one or more notches that engage with the collar 151 to prevent relative rotation between the collar 151 and the insulator 162.

It is understood that variations may be made in the foregoing without departing from the scope of the present disclosure. In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes, and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

The invention claimed is:

1. A data transmission system for use with a drill string in a primary wellbore, the data transmission system comprising: a toroidal antenna assembly disposed around the drill string at a single primary downhole location within the primary wellbore and configured to transmit a signal from a transmitter, wherein the signal corresponds to sensor data and the toroidal antenna assembly comprises: a plurality of toroidal antennas embedded within a single insulator, wherein each toroidal antenna is configured to transmit the: wherein the single insulator is prefabricated with the plurality of toroidal antennas embedded therein.

2. The data transmission system of claim 1, wherein the plurality of toroidal antennas are configured to transmit the same signal at a same frequency and a same phase.

3. The data transmission system of claim 1, wherein each of the plurality of toroidal antennas comprises:

a core disposed around the drill string; and
a winding disposed around the core.

4. The data transmission system of claim 3, wherein the winding of each of the plurality of toroidal antennas is configured to be electrically coupled in a parallel arrangement to the transmitter.

5. The data transmission system of claim 4, wherein the plurality of toroidal antennas comprises at least three toroidal antennas.

6. The data transmission system of claim 3, wherein the winding of each of the plurality of toroidal antennas comprises a solenoidal winding.

7. The data transmission system of claim 3, wherein the winding of each of the plurality of toroidal antennas is configured to be electrically coupled in a series arrangement to the transmitter.

8. The data transmission system of claim 3, wherein the winding of each of the plurality of toroidal antennas is configured to be independently electrically coupled to the transmitter.

9. The data transmission system of claim 1, further comprising:
an electrode configured to be disposed in a secondary wellbore, wherein the secondary wellbore is offset from the primary wellbore, the electrode comprising:
a conductor extending from a secondary surface location to a secondary downhole location; and
an insulator disposed around the conductor and extending along a length of the conductor, wherein the insulator exposes a receiving end of the conductor at the secondary downhole location and the electrode is configured to receive data from the toroidal antenna assembly.

10. The data transmission system of claim 1, further comprising:
a plurality of electrodes configured to be disposed at a surface location, wherein the plurality of electrodes are configured to receive data from the toroidal antenna assembly.

11. The data transmission system of claim 1, further comprising an antenna insulator disposed around the plurality of toroidal antennas.

12. The data transmission system of claim 1, wherein the single insulator comprises an elastomer.

13. The data transmission system of claim 1, wherein the single insulator comprises a plurality of physically connected insulators.

14. A method comprising: drilling a primary wellbore within a formation via a drill string; sensing a drilling parameter via a sensor disposed within a bottom hole assembly of the drill string; and transmitting a signal corresponding to sensor data from the sensor via a plurality of toroidal antennas embedded within a single insulator disposed around the bottom hole assembly, wherein each toroidal antenna transmits the same signal;
wherein the single insulator is prefabricated with the plurality of toroidal antennas embedded therein.

15. The method of claim 14, further comprising:
transmitting the same signal via the plurality of toroidal antennas at a same frequency and a same phase.

16. The method of claim 14, further comprising:
sending the same signal to the plurality of toroidal antennas via a parallel electrical arrangement.

17. The method of claim 14, further comprising:
sending the same signal to the plurality of toroidal antennas via a series electrical arrangement.

18. The method of claim 14, further comprising:
sending the same signal to the plurality of toroidal antennas via an independent electrical arrangement.

19. The method of claim 14, further comprising:
receiving the same signal from the plurality of toroidal antennas using an electrode disposed in a secondary wellbore within the formation, wherein the secondary wellbore is offset from to the primary wellbore.

20. The method of claim 14, further comprising:
receiving the same signal from the plurality of toroidal antennas using a plurality of electrodes disposed at a surface location.

21. The method of claim 14, wherein the single insulator comprises an elastomer.

22. The method of claim 14, wherein the single insulator comprises a plurality of physically connected insulators.

23. A drilling system comprising: a drill string configured to form a primary wellbore within a formation, the drill string comprising: a drill pipe extending from a primary surface location to a primary downhole location within the primary wellbore; a bottom hole assembly coupled to a downhole end of the drill pipe, wherein the bottom hole assembly comprises: a drill collar; and at least one sensor operatively coupled to a transmitter; a toroidal antenna assembly disposed around the drill collar, the toroidal antenna assembly comprising a plurality of toroidal antennas embedded within a single insulator an, operatively coupled to the transmitter and configured to transmit a same signal from the transmitter, wherein the same signal corresponds to sensor data; and a drill bit coupled to the drill collar;
wherein the single insulator is prefabricated with the plurality of toroidal antennas embedded therein.

24. The drilling system of claim 23, wherein the plurality of toroidal antennas are configured to transmit the same signal at a same frequency and a same phase.

25. The drilling system of claim 23, wherein the single insulator comprises an elastomer.

26. The drilling system of claim 23, wherein the single insulator comprises a plurality of physically connected insulators.

* * * * *